(No Model.) 2 Sheets—Sheet 2.
A. L., C. M. & W. G. BROOKS.
INCUBATOR.
No. 579,694. Patented Mar. 30, 1897.
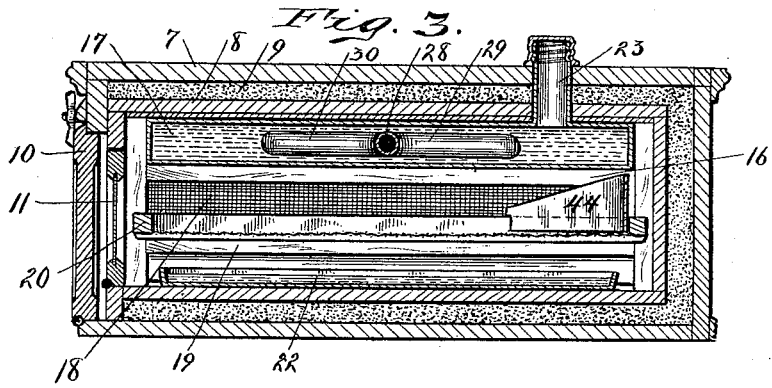
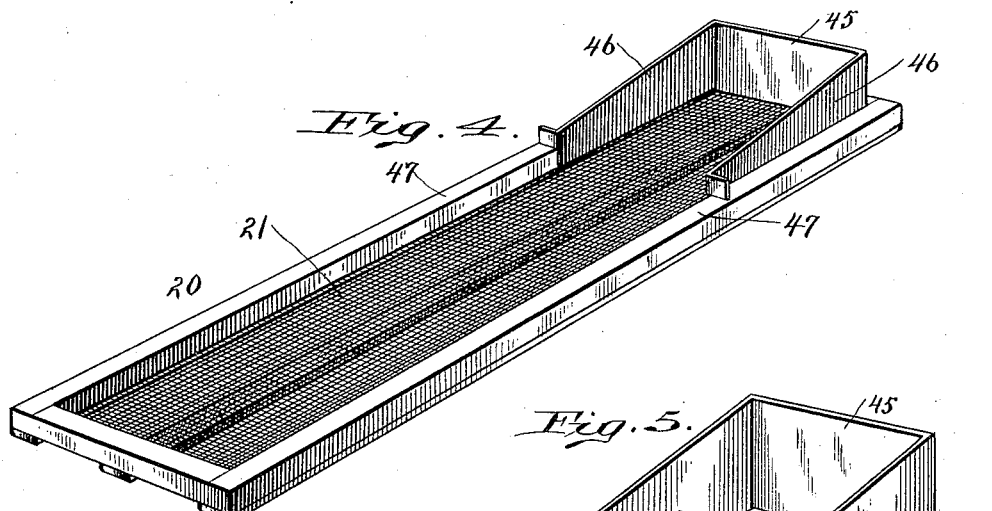
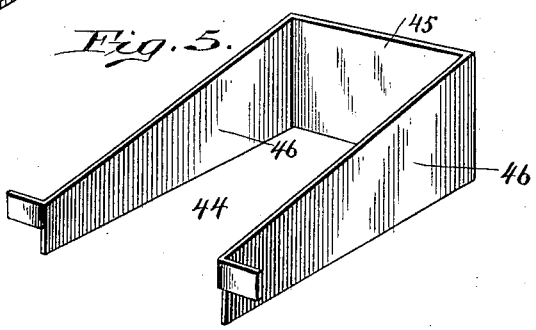
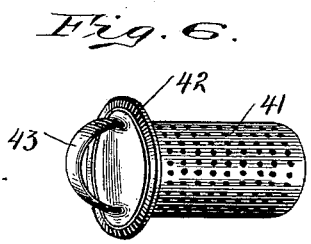
WITNESSES:
H. F. Nealy
M. Austermiller
INVENTORS
Almond L. Brooks
Clarence M. Brooks
Walter G. Brooks
BY
H. P. Woods & Son
ATTORNEYS

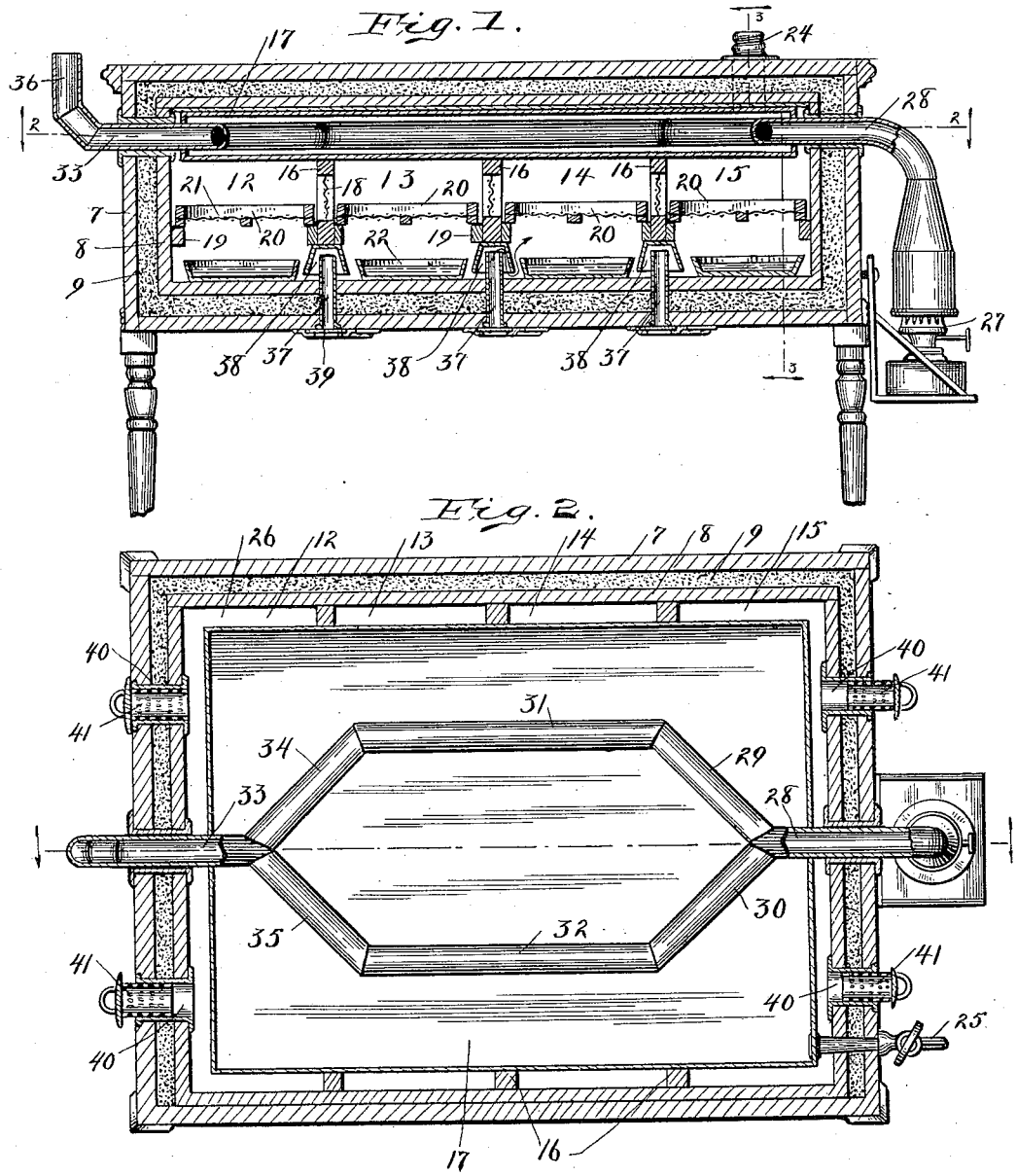

UNITED STATES PATENT OFFICE.

ALMOND L. BROOKS, CLARENCE M. BROOKS, AND WALTER G. BROOKS, OF COLUMBUS, INDIANA.

INCUBATOR.

SPECIFICATION forming part of Letters Patent No. 579,694, dated March 30, 1897.

Application filed June 8, 1896. Serial No. 594,650. (No model.)

*To all whom it may concern:*

Be it known that we, ALMOND L. BROOKS, CLARENCE M. BROOKS, and WALTER G. BROOKS, citizens of the United States, residing at Columbus, in the county of Bartholomew and State of Indiana, have invented a new and useful Incubator, of which the following is a specification.

Our invention relates to an improvement in incubators.

The object of our invention is to produce an incubator the general arrangement and the construction of various details of which will overcome the objections found in existing devices.

The accompanying drawings illustrate our invention.

Figure 1 is a central longitudinal vertical section of our machine. Fig. 2 is a horizontal section thereof on line 2 2 of Fig. 1. Fig. 3 is a transverse section on line 3 3 of Fig. 1. Fig. 4 is a view in perspective of a device for keeping the chicks in the trays, said device being shown in position in the tray. Fig. 5 is a detail of said attachment. Fig. 6 is a detail of a portion of the ventilating means.

In the drawings, 7 indicates the outer casing of the incubator, 8 the inner casing thereof, 9 the packing between said casings, 10 a door formed in the side of casing 7, and 11 one or more doors formed in casing 8, said doors forming a communication into the interior of casing 8, all of the above-mentioned parts being of the usual well-known construction.

The interior of casing 8 is preferably divided into a series of brooding-chambers 12 13 14 15, &c., by means of a series of partitions 16, the upper edges of said partitions forming a series of supports for the hot-water tank 17, said supports preventing the tank from sagging and thereby heating the interior of casing 8 unequally. Partitions 16 are formed in part of a portion 18, formed, preferably, of perforated sheet metal or a piece of wire-netting, which allows a free circulation of air between the various brooding-chambers through said partitions. Mounted in each of said brooding-chambers, so as to slide upon suitable guides 19, is an egg-tray 20, provided with the usual perforated bottom 21, and located beneath each of said trays is a water-pan 22, adapted to contain water for supplying the interior of the brooding-chambers with the required amount of moisture.

Tank 17 is supplied with water through a pipe 23, extending upward through the top of casing 8, through packing 9 and casing 7, and provided with a suitable cap 24, and the water may be drawn from said tank through a faucet 25. It is desirable in incubators that the temperature be uniform in all parts of each brooding-chamber, and it is also desirable that there be as little waste of heat as possible. Tank 17 is therefore made somewhat smaller than the interior of casing 8, so that an air-space 26 is formed between the edges of said tank and the walls of said casing.

The water in tank 17 is heated by means of a current of heated air furnished by a lamp 27, and in order to distribute said heated air through said water in such a way that the water will become uniformly heated a single flue 28 is passed through the walls of casings 7 and 8 and into the end of the tank, the outer end of said flue being provided with an enlarged mouth which projects down over the lamp far enough to catch all of the heat rising therefrom. The inner end of flue 28 projects but a short distance into the tank, and to said inner end are connected two diverging flues 29 and 30, said flues also connecting, respectively, with two parallel flues 31 and 32, the ends of which are connected with a flue 33 by means of two converging flues 34 and 35, flue 33 extending through the walls of casings 8 and 7 and projecting upward to form a chimney 36. Flues 31 and 32 are so placed that the distance between said flues and the outer walls of the tank is equal to one-half of the distance between the said flues. By this arrangement of flues the heat is uniformly distributed through the water, but at the same time the flues are not sufficiently long to cause the air-current to become too cool to properly heat the water in the farther end of the tank.

During the process of incubation it is necessary that the brooding-chamber be supplied with a current of fresh air sufficient in amount to carry off the gases arising from the hatching eggs. It is desirable that this current of air shall be such that it will not materially affect the temperature of the brooding-chamber, and it has heretofore been customary to introduce said air directly into the bottom of the brooding-chamber through one or more pipes 37. In our construction a series of such pipes are introduced into the brooding-chamber beneath each of the partitions 16, said pipes projecting some distance up into the chamber, the upper ends of each of said series projecting into an air-chamber 38, the upper end of which is closed and the sides and ends of which project downward nearly to the floor of the brooding-chambers. By this construction the fresh air, after entering pipes 37, passes out from the tops thereof and is deflected downward by the walls of the air-chamber and emerges therefrom into the brooding-chamber, close to the bottom thereof, and passes over the water in pans 22, and then upward through the egg-trays and through the perforated portions of partitions 16. The walls of chamber 38 are kept warm by means of the heated air in the brooding-chambers, and the fresh air, as it passes downward along said walls, becomes also heated before it passes into the brooding-chamber. By this means the fresh air is heated before it passes into the brooding-chambers and therefore does not tend to suddenly chill the temperature thereof, as is the case in the ordinary constructions. Mounted beneath the lower end of each pipe 37 is a slide 39, by means of which the entrance of air may be regulated.

For the purpose of allowing the foul air to escape from the brooding-chambers a series of flues 40 extend from the upper portion of said chambers through casings 8 and 7 and packing 9, and mounted in the outer end of each of said flues is a perforated cylinder 41, the outer end of which is provided with an end 42 and handle 43, by means of which the said cylinders may be partially or wholly withdrawn from the flues. The foul air as it rises passes into flues 40 and into cylinders 41, escaping into the outer air through the perforations of the said cylinders, the rapidity of said escape being very closely regulated by a movement of the cylinders.

It often occurs when the egg-trays are drawn out from the brooding-chamber in order to remove the chicks already hatched that the said chicks will jump off from the inner end of the tray into the water in pan 22. The trays are of considerable length, and it often occurs that the chicks in the water-pans are not noticed and soon drown. For the purpose of preventing the chicks from leaving the egg-tray we provide a guard 44, made preferably of light sheet metal, bent into the form shown, the height of the rear end thereof being substantially equal to the distance between the bottom of the tray and the bottom of the tank 17. Guard 44 is provided with a pair of arms 46, which are formed integral with and project at substantially a right angle from end 45, the forward end of each of said arms being provided with a projecting lip adapted to engage the upper edges of sides 47 of the egg-trays. As previously stated, guard 44 is preferably formed from light sheet metal, and the length of the rear end 45 is made substantially equal to the width between the sides of the egg-tray, the forward ends of arms 46 being slightly separated, so that before the guard can be placed in position it is necessary to spring the said arms together. The said arms may be then slipped into place between the sides 47, and the spring of said arms will hold the attachment in position and prevent it from being easily displaced.

During the first nineteen days of incubation the eggs must be regularly turned, and, as is usual in incubators, an extra tray 20 is provided, so that when an egg-tray is removed the extra tray is placed on top thereof, the eggs being retained between the bottoms of the two trays and the trays reversed, thereby turning the eggs and transferring them from one tray to the other. It will be seen that unless guard 44 were detachable it would be practically impossible to turn the eggs in this easy manner. At the end of the nineteenth day the chicks begin to break their shells, and it is no longer necessary to turn the eggs. Guard 44 is then attached to each tray in the manner described, and the chicks are thereby prevented from leaving the tray until they can be properly removed.

It will be seen that by the construction described there is a perfect circulation throughout all of the brooding-chambers through the perforated portions of partitions 16, but that at the same time the chicks from the various brooding-chambers can in no way become intermingled. It is therefore possible to place eggs from various hens, or from hens from various yards or breeds, in the same incubator, where they will all be brooded under exactly the same conditions without any danger of the chicks becoming mixed, a decided advantage to a breeder, as will be readily understood.

We claim as our invention—

1. In an incubator, a series of brooding-chambers formed therein, said chambers being separated by a series of partitions, each of said partitions being formed in part of a portion allowing a circulation of air therethrough, an egg-tray mounted in each of said chambers, an air-chamber mounted beneath said partitions, the upper end of said chamber being closed and the walls of said chamber extending down near to the bottom of the brooding-chambers, an air-inlet leading into each of said air-chambers and projecting upward into said chambers, an air-outlet leading from said brooding-chambers, a perforated cylinder mounted so as to slide in said outlet, and means for heating the brooding-chambers, substantially as and for the purpose set forth.

2. In an incubator, an attachment for the egg-trays thereof, said attachment consisting of a guard adapted to be secured to the tray and projecting upward therefrom so as to form a wall over which the chicks cannot jump, substantially as described.

3. In an incubator, an attachment for the egg-trays thereof, said attachment consisting of a single piece of material bent in the form shown and adapted to be placed in the end of said tray so as to form a rear wall therefor over which the chicks cannot jump, substantially as described.

4. In an incubator, an attachment for the egg-trays thereof, said attachment consisting of a piece of metal bent so as to form the end 45 and arms 46, said arms being adapted to be inserted between the sides of the tray and to hold the attachment in position by friction against said sides, as and for the purpose set forth.

ALMOND L. BROOKS.
CLARENCE M. BROOKS.
WALTER G. BROOKS.

Witnesses:
JAMES C. TAYLOR,
WM. F. NORTON.